US008155595B2

(12) United States Patent
Sahin et al.

(10) Patent No.: US 8,155,595 B2
(45) Date of Patent: Apr. 10, 2012

(54) METHOD FOR ITERATIVE INTERFERENCE CANCELLATION FOR CO-CHANNEL MULTI-CARRIER AND NARROWBAND SYSTEMS

(75) Inventors: Mustafa E. Sahin, Tampa, FL (US); Ismail Guvenc, Santa Clara, CA (US); Huseyin Arslan, Tampa, FL (US)

(73) Assignee: NTT DoCoMo, Inc., Tokyo (JP)

( * ) Notice: Subject to any disclaimer, the term of this patent is extended or adjusted under 35 U.S.C. 154(b) by 348 days.

(21) Appl. No.: 12/652,337

(22) Filed: Jan. 5, 2010

(65) Prior Publication Data

US 2010/0226356 A1    Sep. 9, 2010

Related U.S. Application Data

(60) Provisional application No. 61/158,155, filed on Mar. 6, 2009.

(51) Int. Cl.
    H04B 1/00   (2006.01)
    H04B 1/04   (2006.01)
    H04B 1/06   (2006.01)
    H04B 1/10   (2006.01)
    H04K 1/10   (2006.01)
    H04K 1/02   (2006.01)

(52) U.S. Cl. .............. 455/63.2; 455/114.2; 455/278.1; 455/296; 375/144; 375/148; 375/260; 375/296

(58) Field of Classification Search .......... 455/501–506, 455/63.1–63.4, 65, 67.13, 114.2–114.3, 296, 455/298–312; 375/144, 148, 260–264

See application file for complete search history.

(56) References Cited

U.S. PATENT DOCUMENTS

| 5,192,918 | A  | * | 3/1993 | Sugiyama ..................... 327/552 |
| 5,953,380 | A  | * | 9/1999 | Ikeda ............................ 375/346 |
| 6,279,158 | B1 | * | 8/2001 | Geile et al. .................... 725/126 |
| 6,292,651 | B1 | * | 9/2001 | Dapper et al. ................ 725/106 |
| 7,068,628 | B2 |   | 6/2006 | Li et al. |
| 7,623,602 | B2 | * | 1/2010 | Rofougaran ................. 455/90.2 |
| 7,899,407 | B2 | * | 3/2011 | Rofougaran ................... 455/73 |

(Continued)

FOREIGN PATENT DOCUMENTS

EP    325815 A1 *    8/1989

(Continued)

OTHER PUBLICATIONS

Vikram Chandrasekhar and Jeffrey G. Andrews, "Uplink Capacity and Interference Avoidance for Two-Tier Cellular Networks," in *Proc. IEEE Global Telecommunications Conference (GLOBECOM)*, pp. 3322-3326, Nov. 2007.

(Continued)

*Primary Examiner* — Thai Hoang
(74) *Attorney, Agent, or Firm* — Haynes and Boone, LLP

(57) ABSTRACT

In a co-channel deployment of narrowband and multi-carrier technologies (e.g., a femtocell and a macrocell), a method provides cancelling of interference which treats the co-channel signals as desired signals and enhances each of them iteratively. At each iteration, each signal is demodulated and regenerated based on symbol decisions already made and a predetermined channel impulse response. To estimate the other (interfering) co-channel signal, the regenerated signal is subtracted from the aggregate signal. Simulations have shown that a method of the present invention can provide fundamental improvement in the performances of both interfering systems in as few as two iterations. The fundamental performance gain that can be obtained outweigh the required computational burden.

26 Claims, 7 Drawing Sheets

U.S. PATENT DOCUMENTS

| | | | |
|---|---|---|---|
| 7,949,310 B2 * | 5/2011 | Rofougaran | 455/81 |
| 8,005,437 B2 * | 8/2011 | Rofougaran | 455/76 |
| 8,054,904 B2 * | 11/2011 | Hwang et al. | 375/267 |
| 2002/0098797 A1 * | 7/2002 | Brede et al. | 455/3.01 |
| 2002/0150187 A1 | 10/2002 | Chugg et al. | |
| 2003/0032390 A1 * | 2/2003 | Geile et al. | 455/3.05 |
| 2007/0009011 A1 | 1/2007 | Coulson | |
| 2007/0110134 A1 | 5/2007 | Guess et al. | |
| 2007/0211687 A1 | 9/2007 | Benjebbour et al. | |
| 2008/0293446 A1 * | 11/2008 | Rofougaran | 455/552.1 |
| 2009/0034437 A1 * | 2/2009 | Shin et al. | 370/278 |
| 2011/0033000 A1 * | 2/2011 | Berens et al. | 375/260 |

FOREIGN PATENT DOCUMENTS

| | | |
|---|---|---|
| EP | 1 959 625 | 8/2008 |

OTHER PUBLICATIONS

R. Nilsson, F. Sjoberg, and J. LeBlanc, "A rank-reduced LMMSE canceller for narrowband interference suppression in OFDM-based systems," *IEEE Trans. Commun.*, vol. 51, No. 12, pp. 2126-2140, Dec. 2003.

A. Coulson, "Narrowband interference in pilot symbol assisted OFDM systems," *IEEE Trans. Commun.*, vol. 3, No. 6, pp. 2277-2287, Nov. 2004.

Z. Wu and C. Nassar, "Narrowband interference rejection in OFDM via carrier interferometry spreading codes," *EEE Trans. Commun.*, vol. 4, No. 4, pp. 1491-1505, Jul. 2005.

D. Zhang, P. Fan, and Z. Cao, "A novel narrowband interference canceller for OFDM systems," in *Proc. IEEE Wireless Commun. and Network. Conf (WCNC)*, vol. 3, Mar. 2004, pp. 1426-1430.

H. Arslan and K. Molnar, "Cochannel interference suppression with successive cancellation in narrowband systems," *IEEE Commun. Lett.*, vol. 5, No. 2, pp. 37-39, 2001.

H. Schoeneich and P. Hoeher, "Iterative semi-blind single-antenna cochannel interference cancellation and tight lower bound for joint maximum-likelihood sequence estimation," *Signal Proc.*, vol. 84, No. 11, pp. 1991-2004, 2004.

PCT International Search Report for International Application No. PCT/US2010/026238 dated May 11, 2010, 2 pages.

PCT Written Opinion of the International Searching Authority for International Application No. PCT/US2010/026238 dated May 11, 2010, 3 pages.

\* cited by examiner

METHOD FOR ITERATIVE INTERFERENCE CANCELLATION FOR CO-CHANNEL MULTI-CARRIER AND NARROWBAND SYSTEMS

CROSS REFERENCE TO RELATED PATENT APPLICATIONS

The present application is related to and claims priority to U.S. provisional patent application ("Provisional Application"), Ser. No. 61/158,155, entitled "A Method for Iterative Interference Cancellation for Co-Channel Multi-Carrier and Narrowband Systems," filed Mar. 6, 2009. The disclosure of the Provisional Application is hereby incorporated by reference in its entirety. The present application is also related to U.S. patent application ("Copending Application"), Ser. No. 12/333,138, entitled "OFDMA-Based Co-channel Femtocell," filed on Dec. 11, 2008. The disclosure of the Copending Application is also hereby incorporated by reference in its entirety.

BACKGROUND OF THE INVENTION

1. Field of the Invention

The present invention relates to wireless communications. More specifically, the present invention relates to interference reduction for co-channel multi-carrier and narrowband wireless communication systems.

2. Discussion of the Related Art

In the near future, third generation (3G) wireless communication systems will transition to fourth generation (4G) wireless communication systems. Two promising physical (PHY) layer technologies for 4G implementation are LTE and WiMAX, which are both multicarrier systems each having a bandwidth as wide as 20 MHz. As compared to these promising technologies, the 5-MHz bandwidth 3G systems (e.g., EDGE, DECT, CDMA-2000, and W-CDMA) are considered narrowband (NB) systems. During the transition phase from 3G to 4G wireless communication systems, some multicarrier and NB systems may need to share the same spectrum. Coexistence of multicarrier and NB wireless communication systems may result in performance degradation in both systems due to co-channel interference (CCI).

FIG. 1 shows a wireless communication system in which narrowband system 50 (e.g., a W-CDMA based femtocell network), and wideband system 20 (e.g., a macrocell network) coexist within service area 60 of wideband system 20, sharing a communication channel. Under such an arrangement, interference exists between the femtocell mobile stations (fMSs) and the macrocell base station (mBS), as indicated by reference numeral 30. In addition, interference exists between the femtocell base station (fBS) and some of the mobile stations of wideband system 20, as indicated by reference numeral 40. As macro-cellular networks migrate to wideband multicarrier-based technologies, and while existing 3G femtocells migrate slowly to 4G, a "Long Term Evolution" (LTE) based macrocell may coexist with 3G femtocells within the macrocell's coverage area. For improved performance, fMSs preferably cancel interference 30. Similarly, to improve performance, interference 40 may be mitigated at MS 10. Other similar conditions in the uplink where the narrowband users interferes with the fBS, and the fMS interferes with the mBS can be easily analyzed, and mitigation of interference would also improve the performance under these conditions.

Recently, femtocells have gained considerable attention and several trial deployments have been reported by different operators. Initial deployments of femtocells are based on CDMA-based technologies (e.g., W-CDMA). The article, "Uplink Capacity and Interference Avoidance for Two-Tier Cellular Networks" ("Chandrasekhar") by Vikram Chandrasekhar and Jeffrey G. Andrews, published in Proc. IEEE Global Telecommunications Conference (GLOBECOM), pp. 3322-3326, November 2007, discloses two options for femtocell deployment. According to Chandrasekhar, femtocell users and macrocell users in a split spectrum network may use orthogonal subchannels. However, while interference between the macrocell and the different femtocells is minimal because of the use of the orthogonal subchannels, the spectrum is not efficiently utilized. In contrast, in a shared spectrum network, femtocell users may use subchannels that are already being used by the macrocell (i.e., a co-channel operation) under certain conditions. Despite the possibility of interference, which may be insignificant if the fBS is far away from the mBS, co-channel femtocell deployment are advantageous because of a greater and more efficient spectrum utilization, and a simpler cell-search process.

Using orthogonal frequency division multiplexing (OFDM) to suppress narrowband interference (NBI) is discussed, for example, in the articles (a) "A rank-reduced LMMSE canceller for narrowband interference suppression in OFDM-based systems" ("Nilsson"), by R. Nilsson, F. Sjoberg, and J. LeBlanc, published in *IEEE Trans. Commun.*, vol. 51, no. 12, pp. 2126-2140, December 2003; (b) "Narrowband interference in pilot symbol assisted OFDM systems" ("Coulson"), by A. Coulson, published in *IEEE Trans. Commun.*, vol. 3, no. 6, pp. 2277-2287, Nov. 2004; (c) "Narrowband interference rejection in OFDM via carrier interferometry spreading codes" ("Wu"), by Z. Wu and C. Nassar, published in *IEEE Trans. Commun.*, vol. 4, no. 4, pp. 1491-1505, July 2005; and (d) "A novel narrowband interference canceller for OFDM systems" ("Zhang"), by D. Zhang, P. Fan, and Z. Cao, published in *Proc. IEEE Wireless Commun. and Network. Conf. (WCNC)*, vol. 3, March 2004, pp. 1426-1430.

Nilsson uses linear minimum mean-square error (LMMSE) estimates of interference. Nilsson's algorithm requires à priori information about the power spectral density of the NB signal. In Coulson, a normalized least mean squares (N-LMS) adaptive noise cancellation algorithm suppresses NBI in a pilot symbol-assisted OFDM system. Wu discloses NBI rejection using interferometry spreading codes. Zhang discloses an NBI canceller for an OFDM system in which the NB signal is estimated over unused OFDM subcarriers. Zhang's method is limited in practice because of the small number of unused subcarriers in a well-designed OFDM based system.

Iterative methods for mitigating CCI are disclosed, for example, in the articles (a) "Cochannel interference suppression with successive cancellation in narrow-band systems" ("Arslan"), by H. Arslan and K. Molnar, published in *IEEE Commun. Lett.*, vol. 5, no. 2, pp. 37-39, 2001; and (b) "Iterative semi-blind single-antenna cochannel interference cancellation and tight lower bound for joint maximum-likelihood sequence estimation" ("Schoeneich"), by H. Schoeneich and P. Hoeher, published in *Signal Proc.*, vol. 84, no. 11, pp. 1991-2004, 2004. Both Arslan's and Schoeneich's systems are narrowband only. Arslan, for example, teaches exploiting the differences in signal features (e.g., relative delay) to obtain an initial signal separation, which can considerably increase iterative interference cancellation efficiency.

SUMMARY

The present invention is applicable to a co-channel deployment of the narrowband and multi-carrier technologies (e.g., a femtocell and a macrocell), and other situations involving coexistence of a narrowband system and a multicarrier system. The present invention is applicable also to system having neighboring macrocells, where cells on one side of a service area use a multicarrier signaling technology (e.g., LTE), while cells on the other side of the service area use a narrower bandwidth technology (e.g., W-CDMA). Such a system arises in an urban area where migration to a next generation wireless system may happen faster than a neighboring rural region, which may still be using a 3G technology. The present invention provides cancelling of interference for the cell-edge users, so as to improve their performance. A different application of the present invention is in the coexistence of multi-carrier based ultra-wideband (UWB) systems with the relatively narrowband technologies. According to one embodiment of the present invention, an inherent initial signal separation may be used that is due to the difference between multicarrier interfering signals and single carrier interfering signals.

In one embodiment, the interfering systems are both capable of transmission and reception. The present invention provides a method which treats the co-channel signals as desired signals and enhances each of them iteratively. In each iteration, both the wideband and the narrowband signals are demodulated and regenerated based on symbol decisions already made and a predetermined channel impulse response. To estimate the other (interfering) co-channel signal, the regenerated signal is subtracted from the aggregate signal. Simulations show that a method of the present invention can provide fundamental improvement in the performances of both interfering systems in as few as two iterations. The fundamental performance gains that can be obtained outweigh the required computational burden.

The present invention is better understood upon consideration of the detailed description below, in conjunction with the accompanying drawings.

DETAILED DESCRIPTION OF THE PREFERRED EMBODIMENTS

Figure 3:
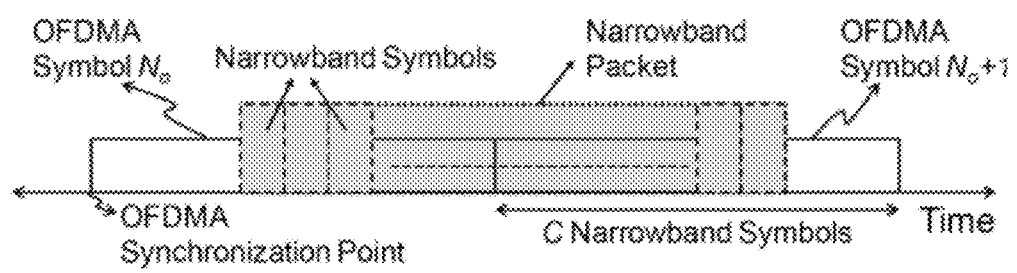
FIG. 3 is an illustration of coexisting OFDMA and narrowband signals in the time domain.
Figure 4:
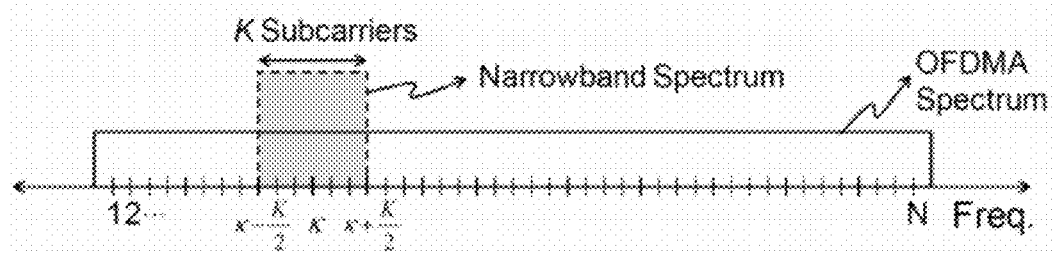
FIG. 4 is an illustration of coexisting OFDMA and narrowband signals in the frequency domain.

The present invention is illustrated herein by a system having both a macrocell network and one or more femtocell networks, and the multicarrier system (e.g., the macrocell network) uses an orthogonal frequency division multiple access (OFDMA)-based PHY layer. In this detailed description, all participants are assumed to have transceiver functionalities. The primary receiver with the capability to cancel narrowband interference according to a method of the present invention is an OFDMA receiver (i.e., a receiver in which time and frequency synchronization to the OFDMA signal is ensured). FIG. 3 and FIG. 4, show the NB and OFDMA signals in time and frequency domains. Synchronizing to the OFDMA symbols rather than NB symbols is preferable even if the start and end times of a targeted packet of NB symbols do not coincide with the boundaries of the OFDMA symbols.

Figure 5:
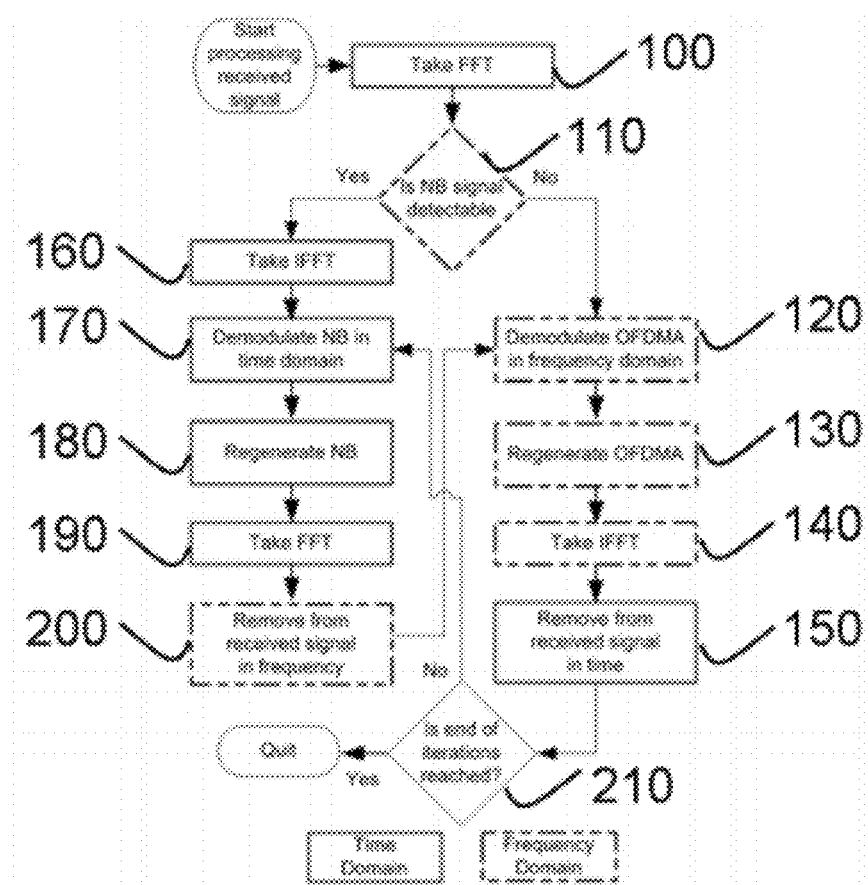
FIG. 5 is a block diagram illustrating a cancellation algorithm that can be applied at the primary receiver to cancel interference (from only one narrowband interferer), according to one embodiment of the present invention.
Figure 6:
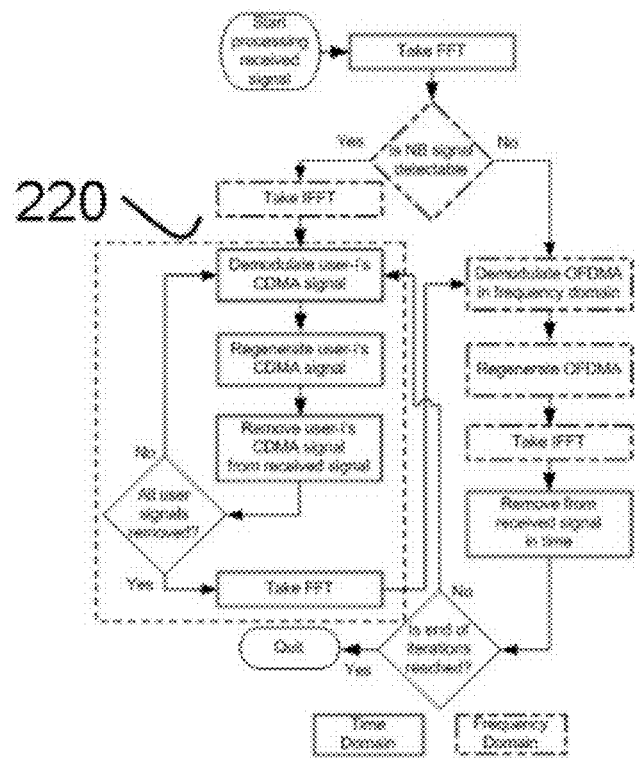
FIG. 6 is a block diagram illustrating a cancellation algorithm that can be applied at the primary receiver to cancel interference (from multiple narrowband interferers), according to one embodiment of the present invention.

FIG. 5 is a block diagram illustrating a cancellation algorithm that can be applied at the primary receiver to cancel interference from one narrowband interferer, according to one embodiment of the present invention. FIG. 6 is a block diagram illustrating the cancellation algorithm at a primary receiver for canceling interference from multiple narrowband interferers.

A sampled downlink OFDMA signal in time domain can be represented by:

$$x(n) = \sqrt{P_{tx}} \sum_{k=0}^{N-1} X(k)e^{j2\pi kn/N}, \quad -N_{cp} \leq n \leq N-1, \quad (1)$$

where $P_{tx}$ is the total transmitted power per symbol, N is the number of subcarriers used in the signal, k is the subcarrier index, $N_{cp}$ is the length of the cyclic prefix (CP), and X(k) is the data modulated on the kth subcarrier. The received time-domain OFDMA signal that traverses through a L-tap multipath channel to arrive at the primary receiver is given by:

$$y(n) = \sqrt{E_{rx}} \sum_{l=0}^{L-1} h(l)x(n - D_l), \quad (2)$$

where $E_{rx}$ is the received energy per symbol, h(l) is the channel coefficient for the l-th tap, and $D_l$ is the delay of the l-th tap. Assuming that the tap delays do not exceed the length of the CP length, after a fast fourier transform (FFT) on the received time-domain OFDMA signal at step 100 of FIG. 5, the resulting frequency-domain OFDMA spectrum is given by:

$$Y(k) = \sqrt{E_{sc}} H(k)X(k)e^{-j2\pi kD_l/N}, \quad (3)$$

where H(k) is channel frequency response, and $E_{sc}$ the average received energy per subcarrier, which depends on the number of subcarriers, N, through the relation $E_{sc}=E_{rx}=N$. On the other hand, the narrowband signal can be modeled by:

$$s(n) = \sum_{m} a_m g(n - mT), \quad (4)$$

where m is the symbol index, $a_m$ denotes the data, g(n) is the pulse shaping filter, and T is the narrowband symbol duration. As s(n) arrives at the primary receiver through a multipath channel h'(n) with L' taps, the received signal at the primary receiver is given by:

$$z(n) = \sum_{l'=0}^{L'} h'(l')s(n - D_{l'}), \quad (5)$$

where $D_{l'}$ is the delay of the l'-th tap.

Figure 1:
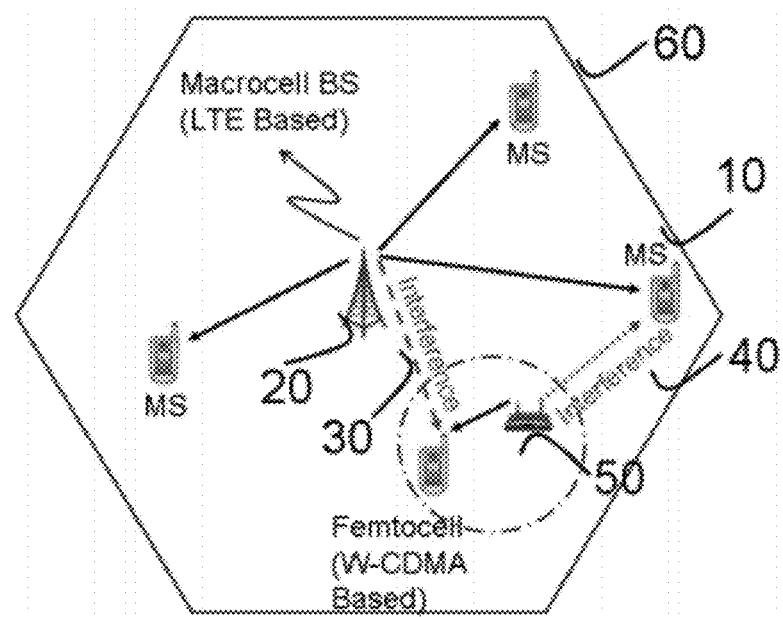
FIG. 1 shows a system in which narrowband system 50 and wideband system 20 coexist and share a communication channel.
Figure 2:
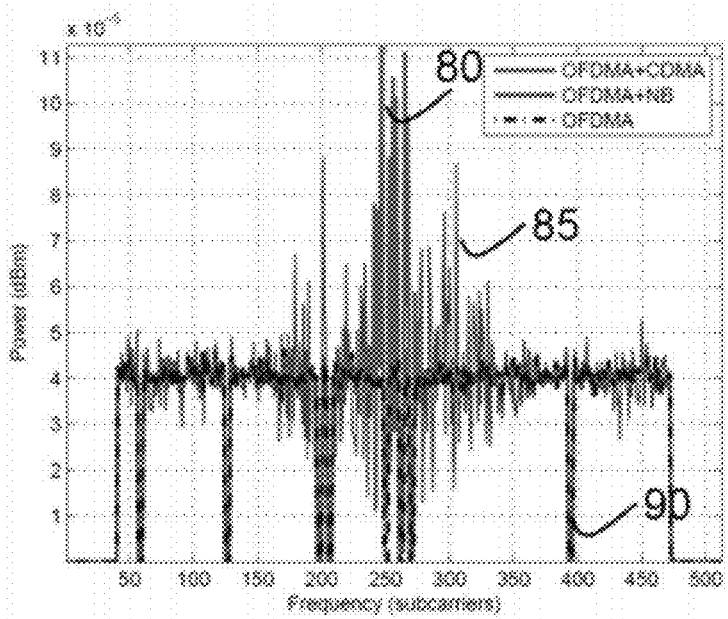
FIG. 2 shows the spectra of OFDMA signal 90, OFDMA with NB signal 80 and OFDMA with CDMA signal 85.

FIG. 2 shows the spectra of OFDMA signal 90, OFDMA with NB signal 80 and OFDMA with CDMA signal 85. In the time domain (shown in FIG. 3), the NB portion of the signal appears as structured information and the OFDMA portion of the signal appears as random noise. In the frequency domain (shown in FIG. 4), however, the OFDMA portion of the signal is structured information and NB portion of the signal can be seen as random noise (see, e.g., the spectrum of OFDMA with NB signal 80 in FIG. 2). An OFDMA signal y(n) on which an NB signal z(n) superimposed is represented in time domain by signal r(n), given by:

$$r(n) = z(n) + \underbrace{\sum_{k=0}^{N-1} Y(k)e^{j2\pi k n/N}}_{y(n)} + w(n), \quad (6)$$

where w(n) is an additive white Gaussian noise (AWGN). In the frequency domain, the spectrum of signal r(n) is represented by R(k), given by:

$$R(k) = Y(k) + \underbrace{\sum_{n=0}^{N-1} z(n)e^{-j2\pi k n/N}}_{Z(k)} + W(k), \quad (7)$$

where Z(k) and W(k) are the frequency domain reciprocals of z(n) and w(n) (e.g., their FFT spectra), respectively.

The method illustrated by FIG. 5 cancels CCI using iteratively refined estimates of both Y(k) and z(n). To begin, an initial estimate of either z(n) or Y(k), denoted $\hat{z}(n)$ and $\hat{Y}(k)$ respectively, is obtained. Spectrum Z(k) of NB signal z(n) may overlap with M subcarriers of multicarrier spectrum Y(k). In that situation, if the center frequency of spectrum Z(k) is in the neighborhood of subcarrier κ, spectrum Z(k)≠0 only for frequency window κ−M/2<k<κ+M/2. Initial rough estimate $\hat{z}(n)$ for NB signal z(n) may be obtained, if spectrum Z(k) is detected at step 110 to have a signal-to-interference ratio (SIR) exceeding a predetermined threshold. Detection at step 110 may be accomplished using an energy detector whose threshold is set according to the average signal-to-noise ratio (SNR) level outside of frequency window κ−M/2<k<κ+M/2. When the number of subcarriers whose energy exceeds the predetermined threshold is greater than M/2, which is half the number of subcarriers overlapping the non-zero portion of spectrum Z(k), initial estimate $\hat{z}(n)$ for NB signal z(n) may be obtained at step 160 by taking an inverse fast Fourier transform (IFFT) of the signal spectrum within the frequency window κ−M/2<k<κ+M/2:

$$\hat{z}(n) = \sum_{k=-M/2}^{M/2} R(k)e^{j2\pi k n/N}. \quad (8)$$

Initial estimate $\hat{z}(n)$ is demodulated at step 170 and, based on symbol decisions, NB signal $\tilde{z}(n)$ is regenerated at step 180. Regenerated NB signal $\tilde{z}(n)$ is deemed a cleaner version of signal $\hat{z}(n)$, presumably without AWGN noise w(n) and less affected by CCI. An FFT of regenerated NB signal $\tilde{z}(n)$ at step 190 provides a spectrum that can be subtracted from the received signal spectrum R(k) at step 200 to provide initial estimate $\hat{Y}(k)$ of multicarrier spectrum Y(k).

At step 110, however, if the NB signal is too weak to provide a useful estimate, then R(k) is used as initial estimate $\hat{Y}(k)$ for multicarrier spectrum Y(k). Whether obtained from step 110 or step 200, initial estimate $\hat{Y}(k)$ for multicarrier spectrum Y(k) can be demodulated at step 120 and, based on symbol decisions, multicarrier signal $\tilde{Y}(k)$ is regenerated at step 130. Regenerated multicarrier signal $\tilde{Y}(k)$ is deemed a cleaner version of signal $\hat{Y}(k)$. An IFFT of regenerated multicarrier signal $\tilde{Y}(k)$ at step 140 provides a time domain signal that can be subtracted from the received signal r(n) at step 150 to provide a refined estimate of NB signal z(n). So long as the maximum number of iterations has not been reached, the refined estimate of NB signal z(n) can be used in the next iteration of steps 170-200 to obtain the next estimate of multicarrier spectrum Y(k) which, in turn, can be used to further iteratively refine the estimate of NB signal z(n) in steps 120-150.

As initial estimates $\hat{z}(n)$ and $\hat{Y}(k)$ are corrupted by CCI and AWGN, the symbol decisions made at steps 170 and 120 may include errors. However, an error in a symbol decision on $\hat{z}(n)$ is not localized in the frequency domain. In fact, such an error is spread over M subcarriers. Similarly, a symbol decision error on a corrupted subcarrier in initial estimate $\hat{Y}(k)$ is spread over N samples in time domain. Thus, subtracting $\tilde{z}(n)$ with its symbol errors from r(n) does not necessarily further propagate the error into the subcarriers of initial estimate $\hat{Y}(k)$ of multicarrier spectrum Y(k). For the same reason, when estimate $\hat{Y}(k)$ with its erroneously demodulated subcarriers is removed from received spectrum R(k), the errors may not necessarily propagate into refined estimates of NB signal z(n).

Figure 7:
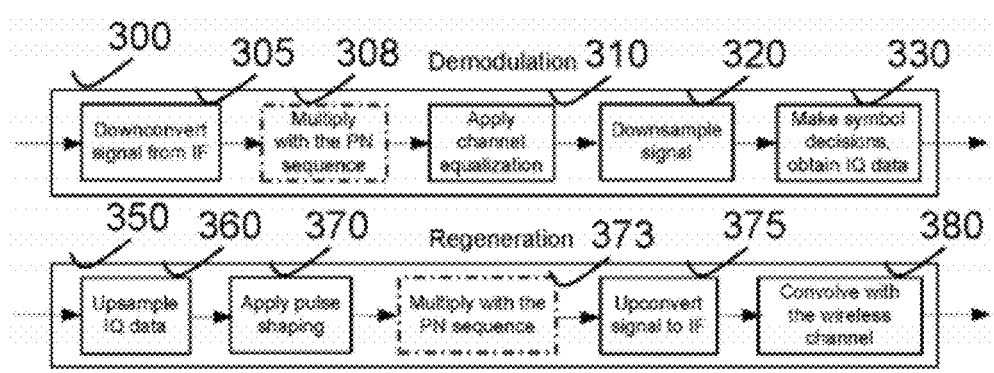
FIG. 7 is a flow chart which illustrates detailed operations of demodulation and regeneration steps 300 and 350 for an NB signal.

FIG. 7 is a flow chart which illustrates detailed operations of demodulation and regeneration steps 300 and 350 for an NB signal, representative of steps 170 and 180 of FIG. 5. As shown in FIG. 7, at step 305, the received signal is downconverted to baseband from the frequency of $f_c$-$f_{c'}$, where $f_c$ and $f_{c'}$ are the carrier frequencies of the OFDMA signal and the NB signal, respectively. The remainder of demodulation is performed by applying channel equalization at step 310, downsampling at step 320, and making symbol decisions to obtain the in-phase and quadrature (IQ) data at step 330. For a NB system, carrier frequency $f_{c'}$ is generally known, and an optimum sampling point and a reliable channel estimate ĥ'(n) are generally available. The IQ data may then be provided to regeneration step 350.

At step 360, the IQ data are upsampled. The upsampled IQ data are applied pulse shaping at step 370, upconverted at step 375, and convolved with baseband channel response at step 380. The pulse shaping filter used by the NB system is generally known.

When the NB signal is a CDMA signal, after down-conversion at step 305, the downconverted signal is multiplied at step 308 by a pseudo-noise (PN) sequence corresponding to the NB signal. Similarly, in regeneration, after applying pulse-shaping at step 370, the pulse-shaped signal is multiplied with the corresponding PN sequence.

For demodulation and regeneration of an OFDMA system (e.g., steps 120 and 130 of FIG. 5), as the received signal r(n) is already at baseband, being the carrier frequency $f_c$ of the OFDMA signal, downconversion and downsampling are not performed. Channel estimation to obtain $\hat{H}(k)$ can be performed over pilot subcarriers. For regeneration of the OFDMA spectrum, upsampling and upconversion are not performed.

While the example of a single narrowband interferer is illustrated in FIG. 5, the present invention is applicable also to scenarios where there are multiple narrowband interferers. When there are multiple narrowband interferers, the impact of all the narrowband interferers should be canceled in time domain. As illustrated in FIG. 6, cancellation is achieved by demodulating each of the narrowband signals in the time domain, subtracting each demodulated signal from the received signal, and iterating this procedure until all the narrowband signals are subtracted from the received signal 220. To achieve better accuracy, it is preferable to demodulate, regenerate, and subtract in the order of the decreasing strength in the remaining narrowband signals, so that more reliable estimates of the narrowband signals are obtained after each step. Once all the narrowband signals are estimated, the receiver operates in the frequency domain, and demodulates the OFDMA signal (free of all narrowband interfering signals). The receiver then iterates a number of times between time and frequency domains before making a final decision about the recovered data.

The above-described method of the present invention processes the entire OFDMA band rather than processing just the overlapping band. Such an approach is unobvious because processing the entire band in fact has the following disadvantages: First, since $\hat{y}(n)$ is the IDFT of the entire OFDMA band rather than the overlap band only, any errors made in the demodulation of subcarriers $$k \notin \left[\kappa - \frac{K}{2}, \kappa + \frac{K}{2} - 1\right]$$

appear as additive noise in $\hat{z}(n)$, thereby increasing the expected number of NB demodulation errors, especially if K is small, Second, the complexity of the algorithm becomes proportional to N rather than K. However, processing of the entire band is preferable, especially because K is not always accurately known to allow the receiver to focus on the overlap band only. Moreover, subcarriers $$k \notin \left[\kappa - \frac{K}{2}, \kappa + \frac{K}{2} - 1\right]$$

may be affected by the sidelobes of the NB signal, and processing the whole band may therefore be effective. Computer simulations show that, when the whole band is processed rather than the overlap band only, the noise caused by the demodulation errors outside the overlap band does not lead to a noticeable increase in the NB demodulation errors even for K/N ratios as small as 2.5%. Another method that can be used for handling co-channel signals is to demodulate them jointly utilizing a maximum likelihood (ML) estimation technique. For the coexistence scenario in consideration (which is different than prior-art scenarios where ML estimation has been applied), ML estimation might be performed either in the time domain or in the frequency domain. However, the time domain requires a lesser number of computation steps and it is more desirable to perform the ML estimation in the time domain. This is due to the relationship between K and the number of NB symbols within the OFDMA symbol C, which can be written as K=(1+α)C, where α is usually greater than 0.

Denoting the estimates for the NB and OFDMA signals in time domain as $\hat{z}(n)$ and $\hat{y}(n)$, respectively, an ML estimate of both signals can be obtained as $$[\hat{a}_m, \hat{X}(k)] = \arg\min_{a_m, X(k)} \{|r(mT) - z(mT) - y'(mT)|^2\}.$$

$$= \arg\min_{a_m, X(k)} \left\{ \left| r(mT) - \sum_{l=0}^{L_{nb}-1} h'(l)a_{m-l} - \sum_{k=\kappa-\frac{K}{2}}^{\kappa+\frac{K}{2}-1} Y(k)e^{j2\pi k mT/N} \right|^2 \right\}$$

where y'(n) is the time domain reciprocal of Y(k) for $$k \in \left[\kappa - \frac{K}{2}, \kappa + \frac{K}{2} - 1\right].$$

The number of different values that z(mT) and y'(mT) can take should be limited in order for the joint demodulation algorithm to be computationally feasible. This condition is satisfied for both z(mT) and y'(mT) since the data sequences $a_m$ and X(k) each belong to a finite alphabet. There are $M^K$ possibilities for the OFDMA signal in the overlapping band, and M possibilities for each of the C symbols in the NB signal, where M is the number of constellation points depending on the modulation order (e.g., M=4 for QPSK). Therefore, the number of possibilities that need to be considered for each NB symbol is $M_{K+1}$. Implementing the ML estimator requires an exhaustive search through $M_{K+1}$ possible combinations of z(mT) and y'(mT), which are obtained by applying the channel responses to all possible values of $a_m$ and X(k) to yield z(mT) and Y'(k), respectively, and also by computing the inverse DFT (IDFT) for all Y'(k)s to get y'(mT)s. This exhaustive search as well as the computations required for obtaining z(mT) and y'(mT)s render the joint demodulation method prohibitively complex.

Figures 8, 9:
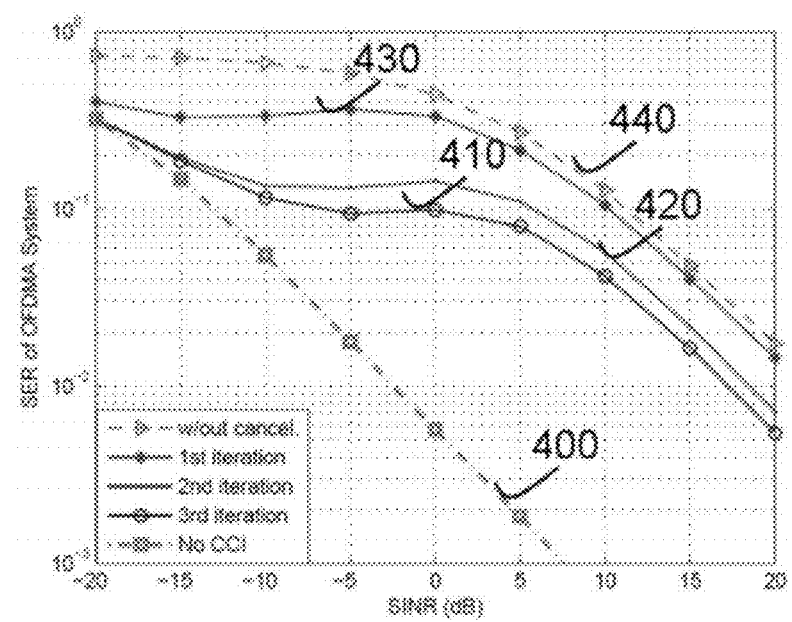
FIG. 8 shows values of parameters in a simulation of a system including both OFDMA and narrowband signals.
FIG. 9 provides the simulation results of the symbol error rates (SER) performance in the OFDMA system, obtained in simulation under an MP channel assumption.

FIG. 8 shows values of parameters in a simulation of a system including both OFDMA and narrowband signals. In one simulation, the OFDMA symbol occupies 400 of the 512 subcarriers, which includes also guard bands and idle subcarriers, and the NB signal overlaps approximately 38 subcarriers in the OFDMA spectrum. Therefore, when the interference from the OFDMA is considered, the interference power is roughly 10 dB less than $P_{tx}$ of the OFDMA signal. The simulation includes OFDMA and NB performances in both AWGN and multipath (MP) channels. For MP channels, a precisely known channel estimation is assumed for the NB system, and an efficient maximum likelihood sequence estimation (MLSE) equalizer is utilized. For the OFDMA system, pilot based channel estimation and equalization are performed. The desired signal power varies over a predetermined range, while noise power and interference SNR are assumed fixed. In one simulation, interference SNR is kept constant at 20 dB. SIR is defined as the ratio of the desired signal power to the interference power over the subcarriers where the OFDMA spectrum overlaps the NB spectrum. The receiver is assumed synchronized to the OFDMA signal, but not necessarily to the NB signal.

Figure 10:
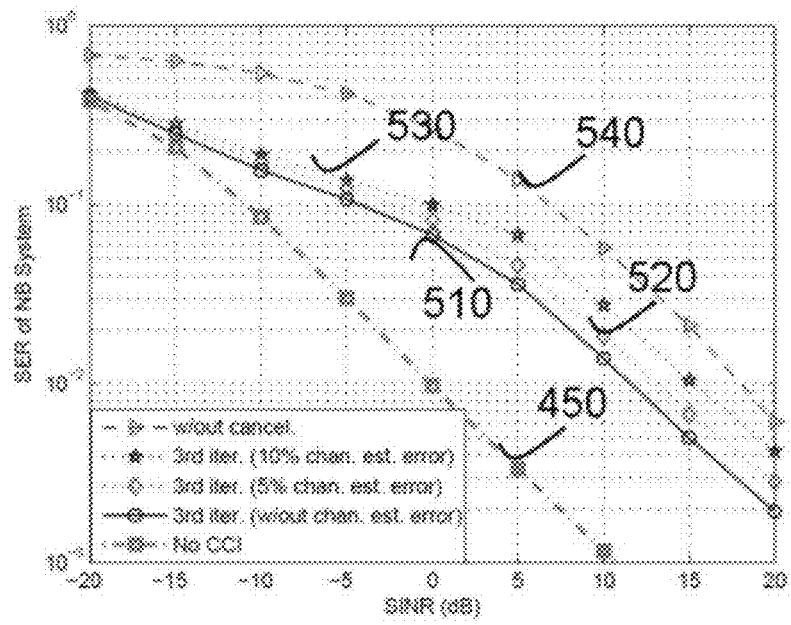
FIG. 10 provides the simulation results of the SER performance in the NB system, obtained in simulation under an MP channel assumption.

FIGS. 9 and 10 provide the symbol error rates (SER) performances in the OFDMA system and in the NB system, respectively, obtained in simulation under an MP channel assumption. In FIG. 9, for a system with CCI, curves 440, 430, 420 and 410 show, respectively, the SER performances in the OFDMA system under no cancellation and after 1-3 iterations of a method of the present invention. As shown in FIG. 9, curves 440 and 410 achieve, after three iterations, an improvement of SER performance of 11 dB at a 0 dB SIR. At greater than 0 dB SIR, the improvement diminishes towards 5 dB. Curve 400 shows the SER performance in the OFDMA system when CCI is not present.

As shown in FIG. 10, curves 540, 530, 520 and 510 show, respectively, the SER performances achieved in the NB system for no cancellation, and after 3 iterations of a method of the present invention with different amounts of channel estimation error. As seen from curves 540 and 510, for an SIR less than 0 dB, the improvement achieved after 3 iterations is around 15 dB. Approaching 0 dB SIR, the improvement narrows. However, even at 10 dB SIR, an improvement of approximately 7 dB is still achieved. Curves 520 and 530 show that reasonable improvements are still possible with channel estimation errors for the narrowband signal. Curve 450 shows the SER performance in the NB system when CCI is not present.

Figure 11:
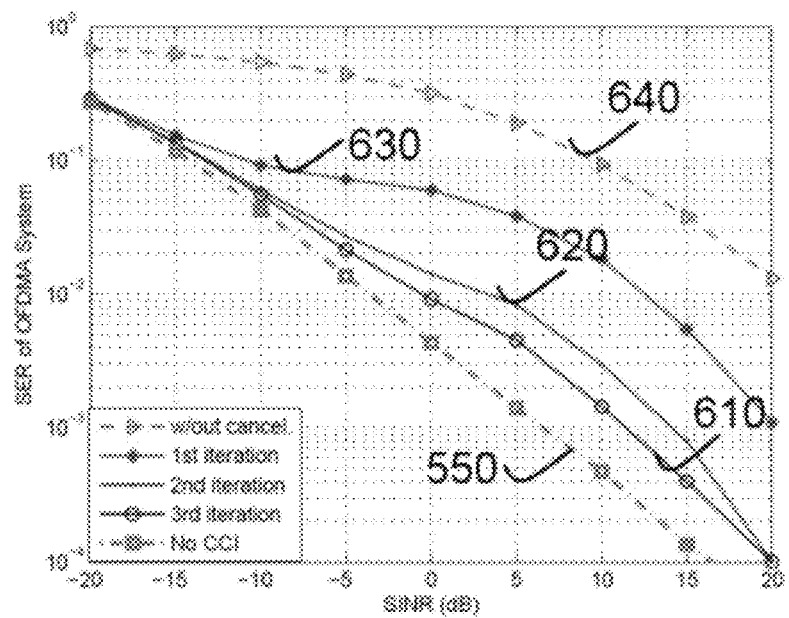
FIG. 11 provides the simulation results of the SER performance in the OFDMA system, under the influence of an UL CDMA system, obtained in simulation under an MP channel assumption.
Figure 12:
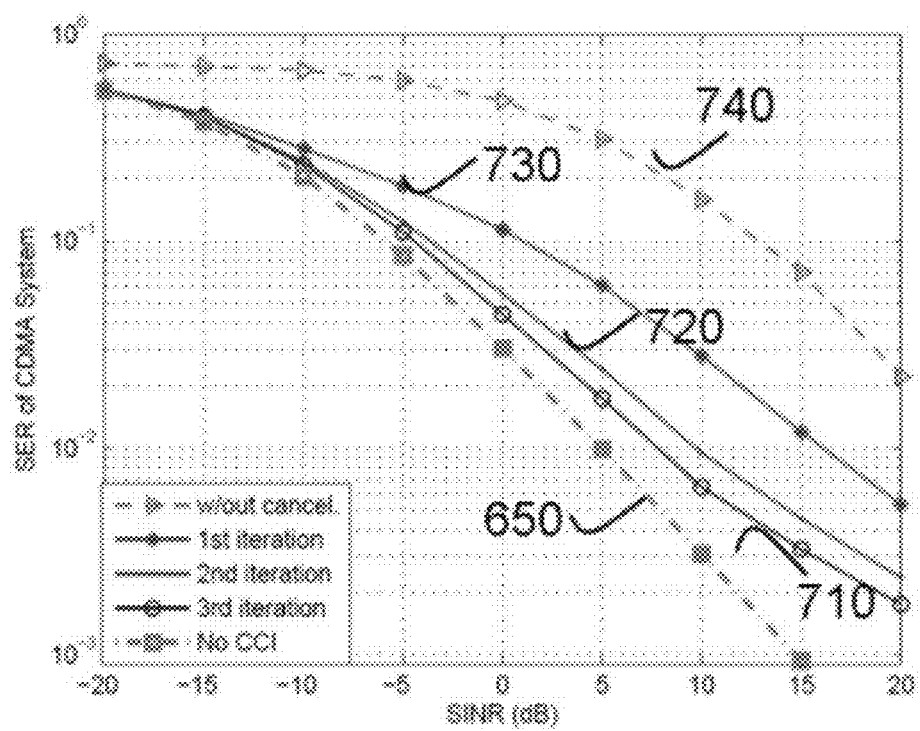
FIG. 12 provides the simulation results of the SER performance in the CDMA system, under the influence of an OFDMA system, obtained in simulation under an MP channel assumption.

FIGS. 11 and 12 provide the symbol error rates (SER) performances in the OFDMA system and in a CDMA system, respectively, obtained in simulation under an MP channel assumption. As shown in FIG. 11, curves 640, 630, 620 and 610 show, respectively, the SER performances achieved in the OFDMA system, under the influence of the UL in a CDMA system, for no cancellation and after 1-3 iterations of a method of the present invention. As seen from curves 640 and 610, SER improvement is significant, and in fact approaching the lower bound indicated by curve 550, which represents the SER performance in the OFDMA system when CCI is not present. The good performance is believed to be achieved due to de-spreading using the PN sequence. This is because a CDMA signal has a weaker spectrum spread over a wider band, relative to an NB signal, resulting in the OFDMA signal being more accurately detectable. Once a reliable initial estimate for the OFDMA signal is obtained, subsequent iterations tend to be more successful.

FIG. 12 provides the simulation results of the SER performance in the CDMA system, under the influence of the OFDMA system, obtained in simulation under an MP channel assumption. As shown in FIG. 12, curves 740, 730, 720 and 710 show, respectively, the SER performances achieved in the CDMA system, under the influence of the OFDMA system, for no cancellation and after 1-3 iterations of a method of the present invention. Therefore, the CDMA performance improvement is more critical. The performance represented by curve 710 (i.e., after 3 iterations) tracks the lower bound up until 0 dB SIR, after which SER performance improvement starts to diminish. The significant difference in SER performance improvement between the NB system of FIG. 10 and the CDMA system of FIG. 12 is also believed to be due to the use of PN sequence.

The above detailed description is provided to illustrate the specific embodiments of the present invention and is not intended to be limiting. Numerous variations and modification within the scope of the present invention are possible. The present invention is set forth in the accompanying claims.

We claim:

1. A method for canceling interference between a multicarrier signal and a narrowband signal from a received signal, comprising:
   (a) from an estimate of a narrowband signal, obtaining a regenerated narrowband signal by eliminating random noise from the estimate of the narrowband signal;
   (b) obtaining the spectrum of the regenerated narrowband signal;
   (c) obtaining an estimate of the spectrum of the multicarrier signal by subtracting a spectrum of the regenerated narrowband signal from a spectrum of the received signal;
   (d) from the estimates of multicarrier signals, obtaining a regenerated spectrum of the multicarrier signal;
   (e) obtaining a refined estimate of the narrowband signal by subtracting a time domain representation of the regenerated spectrum of the multicarrier signal from the received signal;
   (f) using the refined estimate of the narrowband signal to be the estimate of the narrowband signal of step (a), repeat steps (a) to (e) for a predetermined number of iterations; and
   (g) after completing the predetermined number of iterations, recovering the data from the latest regenerated spectrum of the multicarrier signal or the narrowb and signal.

2. A method as in claim 1, wherein the multicarrier signal comprises a signal of an OFDMA system.

3. A method as in claim 2, wherein the OFDMA system is an LTE system.

4. A method as in claim 2, wherein the OFDMA system comprises a multi-carrier ultrawideband system.

5. A method as in claim 1, wherein the narrowband signal comprises a signal of a W-CDMA system.

6. A method as in claim 1, wherein obtaining the regenerated narrowband signal comprises demodulating the estimate of the narrowband signal and making symbol decisions from results of the demodulation.

7. A method as in claim 1, wherein obtaining the regenerated spectrum of the multicarrier signal comprises making symbol decisions from the subcarriers of the estimate of the spectrum of the multicarrier signal.

8. A method as in claim 1, wherein the spectrum of the received signal is obtained using a fast fourier transform of the received signal.

9. A method as in claim 1, wherein the spectrum of the regenerated narrowband signal is obtained using a fast fourier transform of the regenerated narrow band signal.

10. A method as in claim 1, wherein the time domain representation of the regenerated spectrum of the multicarrier signal is obtained using an inverse fast fourier transform of the regenerated spectrum of the multicarrier signal.

11. A method as in claim 1, wherein the multicarrier signal comprises a signal of a single-carrier FDMA system.

12. A method as in claim 1, wherein the narrowband signal is one of multiple narrowband signals.

13. A method as in claim 12, where the receiver iteratively cancels each narrowband user signal in the time domain.

14. A method as in claim 12, where the iteration subtracts the strongest remaining narrowband interferer from the total signal at each iteration.

15. A method as in claim 1, further comprising synchronizing to the multi-carrier symbols.

16. A method as in claim 1, where the regenerated spectrum of the multicarrier signal spans is obtained by processing the estimated spectrum of the multicarrier signal.

17. A method as in claim 1, further comprising processing only an overlap in frequency between the narrowband signal and the multicarrier signal.

18. A mobile station, comprising:
a receiver which carries out a method for canceling interference between a multicarrier signal and a narrowband signal from a received signal, the method comprising:
(a) from an estimate of a narrowband signal, obtaining a regenerated narrowband signal by eliminating random noise from the estimate of the narrowband signal;
(c) obtaining an estimate of the spectrum of the multicarrier signal by subtracting a spectrum of the regenerated narrowband signal from a spectrum of the received signal;
(d) obtaining a regenerated spectrum of the multicarrier signal;
(e) obtaining a refined estimate of the narrowband signal by subtracting a time domain representation of the regenerated spectrum of the multicarrier signal from the received signal;
(f) using the refined estimate of the narrowband signal to be the estimate of the narrowband signal of step (a), repeat steps (a) to (e) for a predetermined number of iterations; and
(g) after completing the predetermined number of iterations, recovering the data from the latest regenerated spectrum of the multicarrier signal.

19. A mobile station as in claim 18, wherein the multicarrier signal comprises a signal of an OFDMA system.

20. A mobile station as in claim 19, wherein the OFDMA system is an LTE system.

21. A mobile station as in claim 18, wherein the narrowband signal comprises a signal of a W-CDMA system.

22. A mobile station as in claim 18, wherein obtaining the regenerated narrowband signal comprises demodulating the estimate of the narrowband signal and making symbol decisions from results of the demodulation.

23. A mobile station as in claim 18, wherein obtaining the regenerated spectrum of the multicarrier signal comprises making symbol decisions from the subcarriers of the estimate of the spectrum of the multicarrier signal.

24. A mobile station as in claim 18, wherein the spectrum of the received signal is obtained using a fast fourier transform of the received signal.

25. A mobile station as in claim 18, wherein the spectrum of the regenerated narrowband signal is obtained using a fast fourier transform of the regenerated narrow band signal.

26. A mobile station as in claim 18, wherein the time domain representation of the regenerated spectrum of the multicarrier signal is obtained using an inverse fast fourier transform of the regenerated spectrum of the multicarrier signal.

* * * * *